US007059593B2

(12) United States Patent
Rivers et al.

(10) Patent No.: US 7,059,593 B2
(45) Date of Patent: Jun. 13, 2006

(54) MAGNETIC HOLDERS FOR ELONGATED WORKPIECES

(75) Inventors: Paul Rivers, Cullman, AL (US); Frederick Diggle, III, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/963,100

(22) Filed: Oct. 12, 2004

(65) Prior Publication Data

US 2006/0076723 A1 Apr. 13, 2006

(51) Int. Cl.
*B23Q 3/00* (2006.01)

(52) U.S. Cl. .......................................... 269/287; 269/8

(58) Field of Classification Search ................ 269/287, 269/8, 3, 6

See application file for complete search history.

(56) References Cited

U.S. PATENT DOCUMENTS

| | | | | |
|---|---|---|---|---|
| 4,112,941 A * | 9/1978 | Larimore | .................... | 600/394 |
| 5,577,426 A * | 11/1996 | Eggert et al. | ................. | 81/439 |
| RE36,797 E * | 8/2000 | Eggert et al. | ................. | 81/439 |
| 6,361,034 B1 * | 3/2002 | Wolfe | ............................ | 269/8 |

* cited by examiner

*Primary Examiner*—Lee D. Wilson
(74) *Attorney, Agent, or Firm*—Merchant & Gould

(57) ABSTRACT

A holder for temporarily stabilizing an end of a flexible rod-like workpiece. The holder includes a magnetic core enclosed within a non-magnetic cover, the overall exterior configuration of the holder preferably being that of a cylinder or disc. An opening extends through the holder for receiving an end of the workpiece as the holder is magnetically attached to a ferrous support surface. A portion of the opening may be smooth so as to receive the rod like workpiece without threaded engagement, and another portion of that opening may be threaded so as to clean the threads of a cut-off segment of threaded rod.

12 Claims, 3 Drawing Sheets

MAGNETIC HOLDERS FOR ELONGATED WORKPIECES

FIELD OF THE INVENTION

This invention relates in general to devices for holding a workpiece, and relates in particular to tools for holding or supporting relatively flexible stock such as rods or the like while working on the stock.

BACKGROUND OF THE INVENTION

Workpiece segments frequently must be cut to a desired length from relatively flexible elongated stock. Rod stock and bar stock are two examples of elongated and relatively flexible workpieces that are available in stock lengths, from which a worker must cut a segment of desired length for a particular use. One such example is found in building construction, where cable hangers for supporting voice and data cable are being installed beneath a structural ceiling of a floor. To install such cable hangers, electricians or other workers typically will first drill a hole in the cement ceiling and then pound a steel anchor into the hole. The anchor presents female threads downwardly from the ceiling and is used for supporting a cable hanger. The worker then cuts a desired length, in many applications about 12 inches, from what is known as all-thread stock. All-thread stock refers to a rod stock threaded along its entire length. All-thread rod for many applications is made of metal, although non-metallic all-thread rod made of fiber-reinforced polymers also is known. All-thread stock typically comes in standard lengths such as six-foot lengths, from which a suitable tool, such as a hacksaw in the case of metallic all-thread rod, is used to cut off desired sections of the rod.

After cutting a section of rod, the worker then attaches two nuts to the section of all-thread stock. That attachment may be difficult because of spurs or other damage to the ends of the threaded rod, caused during the previous cutting step. After attaching those nuts, the worker screws one end of the section of rod into the anchor previously mounted in the ceiling and secures that rod with one of the nuts. The other nut then is rough-positioned on the rod section to define the height (or depth below the ceiling) of the hanger to be supported by that rod section. The worker then attaches a hanger component onto the lower end of the rod segment and secures that bracket with a third nut. The hanger component provides a mounting support, directly or indirectly, for a J-shaped bracket. The J brackets typically cradle a number of voice or data cables extending from point to point below the structural ceiling.

A problem arises when the worker cuts a rod section from the all-thread stock, e.g., with a hacksaw. Because the rod stock is relatively flexible, at least one end of the stock will flop around, delaying the cutting process. When making a cut without someone or something to hold the free end of the all-thread stock, the hacksaw blade frequently snags and extends the cutting time. If the worker has an assistant holding the free end of the all-thread stock, the need for that assistant adds to the cost of construction. Moreover, the hacksaw or other metal-cutting tool typically leaves small metal spurs on the ends of the all-thread stock, making it difficult to screw on the three necessary nuts as mentioned above.

Adding to the problem discussed above, workers are often elevated on scissor jacks or boom lifts near the ceiling, while cutting sections from all-thread stock. The frequency of the hacksaw cutting motion is sometimes close to the resonant frequency of the extended arm-platform-worker combination, causing the boom arm to bounce or sway alarmingly while the worker cuts off a section of the all-thread stock.

SUMMARY OF THE INVENTION

Stated in general terms, holding apparatus according to an embodiment of the present invention includes an element to receive a free end of a workpiece such as rod stock or the like, and an associated magnetic element for holding the apparatus onto a ferrous support surface. The magnetic element thus holds steady the workpiece receiving element and the free end of the rod stock received therein, thereby stabilizing the flexible rod stock while a worker cuts off a section from that stock. The magnetic element allows securing the holding apparatus to any conveniently-located steel or iron surface, without requiring any special connection or attachment manipulation for that purpose.

Stated in somewhat greater detail, apparatus according to an embodiment of the present invention comprises a support member having a magnetic portion for releasably holding the support member to a suitable metallic surface. An opening in the support member is configured to receive an end of an elongated workpiece of predetermined diameter or other external shape. The support member, or at least the magnetic portion of that member, preferably is enclosed within a cover of non-magnetic material, to protect the magnet and the surfaces onto which the apparatus will be magnetically attached. The external configuration of the apparatus preferably has a groove or some other manually-engageable element to facilitate removing the apparatus from a support surface in opposition to the force of magnetic attraction.

Stated in further detail, the workpiece-holding portion of the apparatus may be unthreaded so as to receive an end either of all-thread stock or unthreaded stock, or may alternatively have a threaded portion for engaging all-thread stock. In a particular embodiment of the invention, a hollow element for receiving rod stock is provided to extend through the magnetic body. One end of the hollow element is formed with threads for receiving threads on all-thread stock, and the other end of the element is unthreaded to present a relatively smooth hole. Either end may be used to hold the end of the all-thread stock during cuts, and the threaded end may be used after cutting the all thread to clean the cut end of the all-thread stock.

Accordingly, it is an object of the present invention to provide improved apparatus for holding elongated stock.

It is the other object of the present invention to provide an apparatus for holding an elongated member while that member is undergoing a cutting or other operation.

Other objections and advantages of the present invention will become more apparent from the following description of a preferred embodiment.

BRIEF DESCRIPTION OF DRAWING FIGURES

DETAILED DESCRIPTION OF PREFERRED EMBODIMENTS

Figure 1:
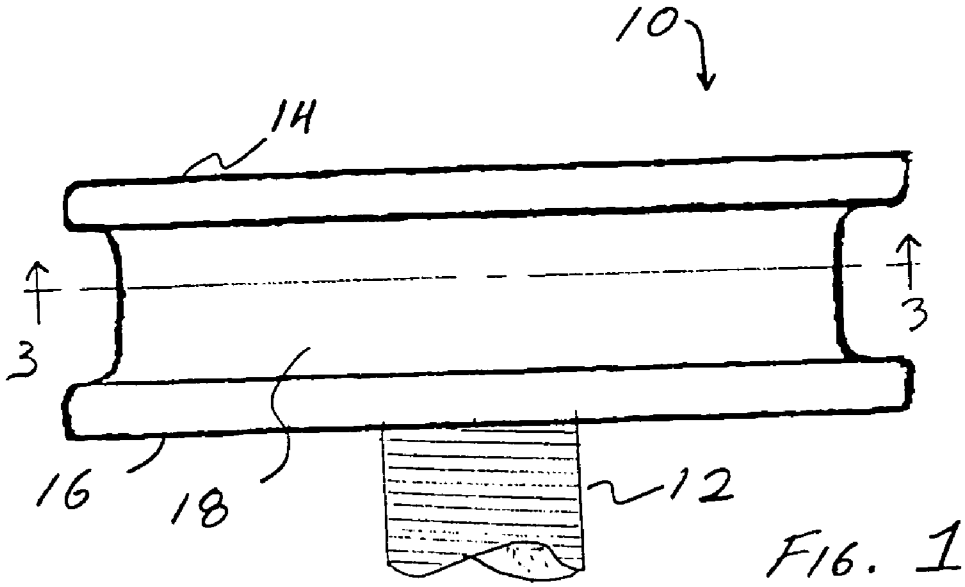
FIG. 1 is a side view of a workpiece holding apparatus according to a preferred embodiment of the present invention, with a fragmentary portion of rod-like workpiece shown for illustrative purposes.
Figure 2:
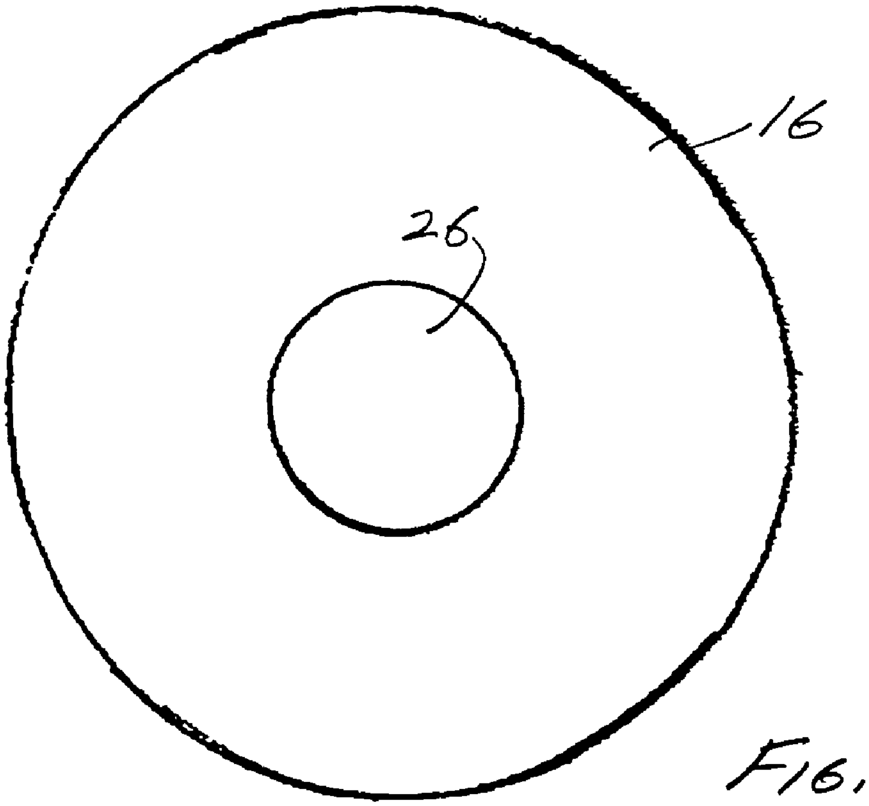
FIG. 2 is a plan view taken from the bottom of FIG. 1, showing the disclosed embodiment without the workpiece.
Figure 3:
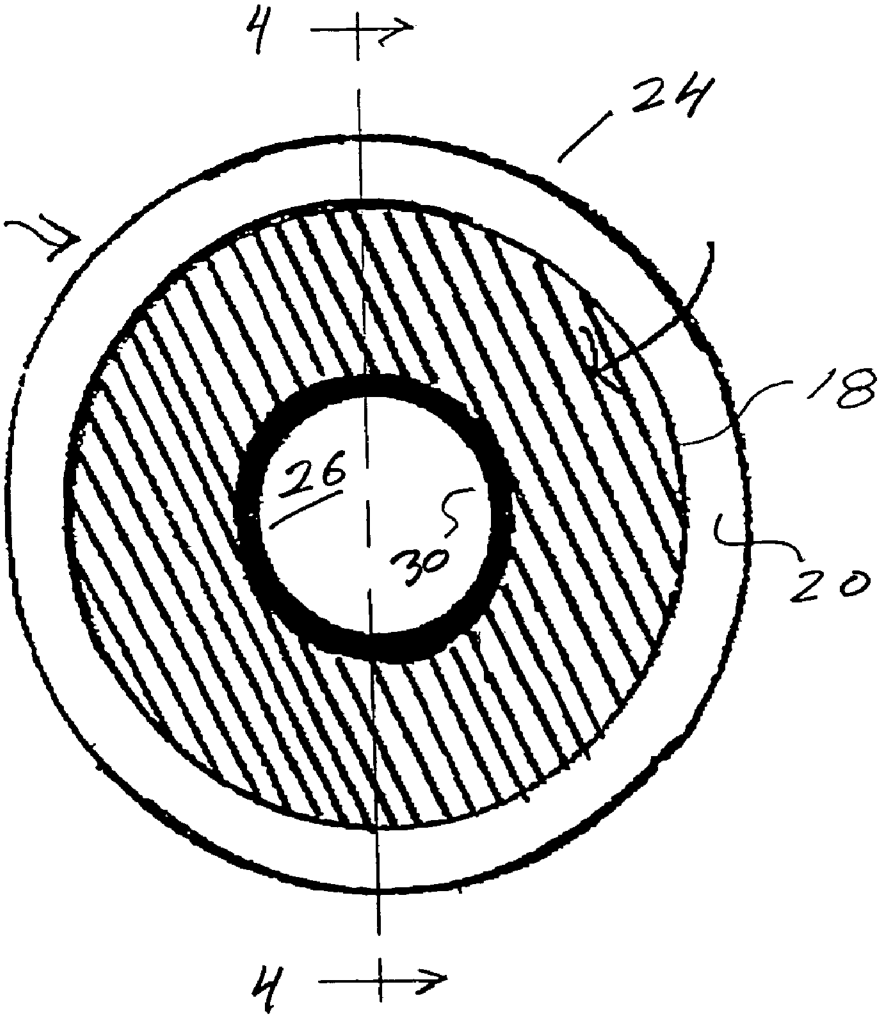
FIG. 3 is a section view taken along line 3—3 of FIG. 1.

Turning first to FIGS. 1–3, there is shown generally a holder 10 according to a disclosed embodiment of the present invention. The holder 10 has somewhat the overall shape of a cylindrical section, with first and second circular sides 14 and 16 mutually parallel and separated by a body 18, although it will be understood that circularity is not a critical feature. The diameter of the body 18 is reduced from the diameters of the adjacent sides 14 and 16, thus forming an annular channel or groove 20 around the exterior of the holder 10 between the sides 14 and 16.

Figure 4:
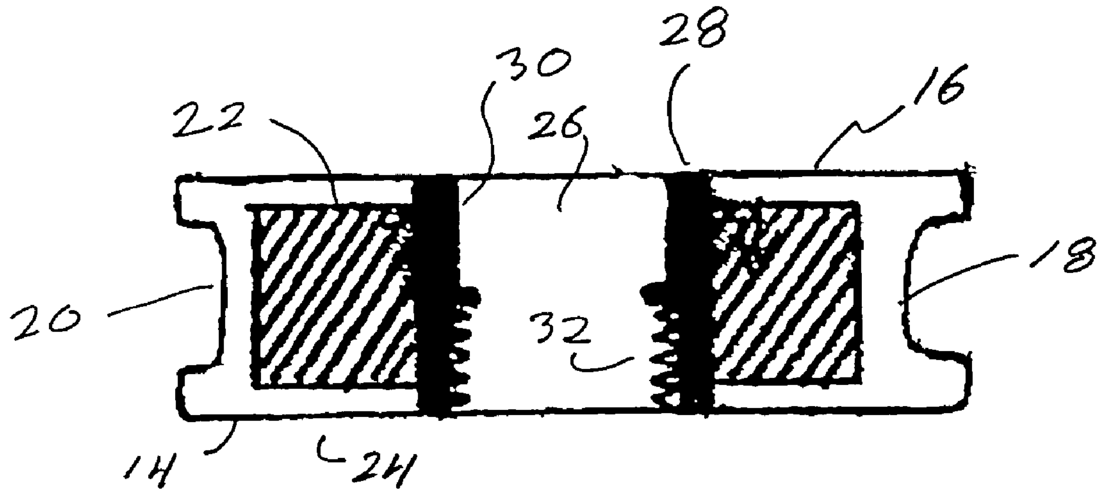
FIG. 4 is a section view taken along line 4—4 of FIG. 3.

Turning to FIGS. 3 and 4, it is seen that the holder 10 has an internal magnetic core 22 comprising a permanent magnet. The magnetic core 22 is cylindrical in shape and may be made of any suitable material having the desired magnetic properties, such as neodymium or the like, exerting sufficient attractive force to attach the holder 10 to a ferrous surface for the purpose described herein.

The magnetic core 22 is preferably enclosed within a surrounding cover 24 to protect the magnetic core and to protect surfaces to which the holder 10 is attached. The cover 24 may be of a suitable plastic or elastomeric material, of a composition or thickness that will not prevent the magnetic core 22 from attaching the holder 10 to a ferrous surface for the intended purpose. As best seen in FIG. 4, the annular groove or channel 20 surrounding the body 18 of the holder 10 is formed as part of the cover 24.

A cylindrical opening 26 extends through the holder 10 from side 14 to side 16, preferably on a central axis of the holder 10. A hollow tubular insert, 28, which may be in the form of a bushing or the like, extends through the opening 26, thereby isolating the magnetic core 22 from contact with anything inserted within the opening. A first portion 32 of an interior wall of the insert 28 preferably is threaded commencing from one side 16 of the holder 10 to a point approximately half way through the opening 26, with the remainder portion 30 of the insert having a smooth or unthreaded surface. The threaded portion 32, for example, may have a ⅜ inch coarse thread corresponding to the thread present on all-thread rod of a particular size, with the unthreaded portion 30 having a diameter sufficient to receive an end of the threaded rod with a somewhat loose fit without engaging the threads. Alternately, the insert 28 could have ⅜ inch threads on the first portion 32 extending from the first side 16 and ¼ inch threads on the remaining portion 30 extending inwardly from the side 14, to accommodate two commonly-used diameters of threaded rod.

The overall size of the holder 10 is not considered critical to its operation and use, so long as the magnetic core 22 has strength sufficient to maintain the holder against a ferrous surface during use as described herein. Using a magnet made of neodymium, the overall diameter of the holder 10 would not have to be more than about 4 inches. The thickness or axial dimension of the holder 10 according to that embodiment would be approximately 1–1¼ inches, allowing sufficient length for both the smooth portion 30 and threaded portion 32 within the insert 28. It should be understood that the foregoing dimensions are exemplary only, and are not considered limiting to the invention as described.

In use, a worker desiring to cut a section, from a length of flexible product such as threaded rod 12 shown in FIG. 1, preferably first attaches the holder 10 to any convenient ferrous surface by placing the side 14 of the holder, opposite to the side 16 into which the smooth portion 30 extends, against that surface. The worker then inserts one end of the threaded rod 12 into the smooth portion 30 of the insert 28 extending through the holder 10, thereby providing a fixed support for stabilizing the threaded rod 12 while the worker cuts off a desired length of that rod 12 using a suitable tool such as a hacksaw or the like. After completing the cutting operation, the worker then removes the cut-off section of threaded rod 12 from the holder 10. If the cut-off end of the threaded rod 12 contains burrs or otherwise requires cleaning, the worker may manually remove the holder 10 from the ferrous surface, gripping the holder along the groove 20 provided for that purpose. The worker then may thread the cut-off rod segment into threaded portion 32 extending from the side 14 of the holder 10, thereby cleaning the cut end to facilitate inserting that end into a ceiling anchor in the customary manner as described above.

If a magnetic holder 10 according to an embodiment of the present invention is provided with a second threaded portion in place of the smooth portion 30, the worker will screw the rod stock into the appropriate threaded end before cutting the rod. After completing the cutting operation, the worker unthreads the cut-off section of rod and may then reverse that section to place the cut-off end in the appropriate opening of the holder, thereby cleaning the threads of that cut-off end.

Figure 6:
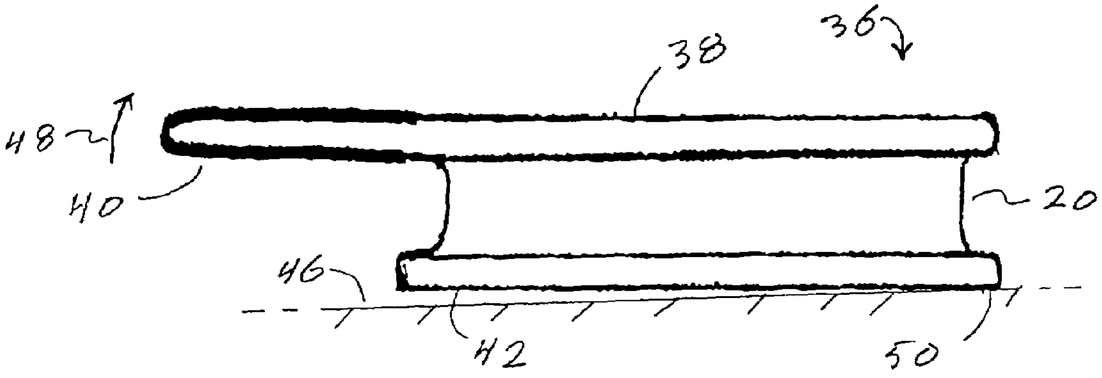
FIG. 6 is a side view of the modified embodiment shown in FIG. 5.
Figure 5:
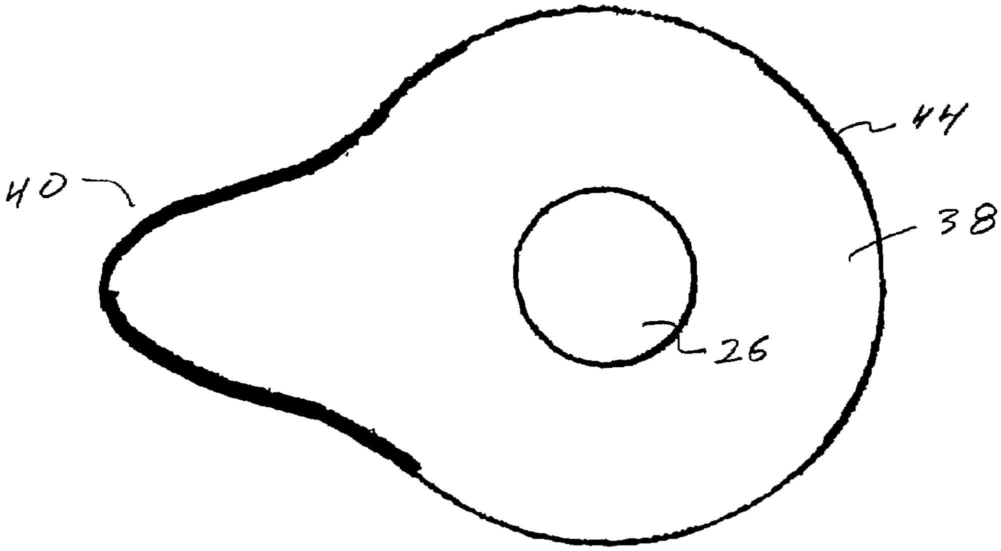
FIG. 5 is a top view showing a modification of the embodiment shown in FIGS. 1–4.

FIGS. 5 and 6 show a holder 36 according to another embodiment of the present invention. On the holder 36, a side 38 of the holder 36 is equipped with a pry lever 40 extending outwardly beyond the nominal periphery of that side 38, as best seen in FIG. 5. An opposite side 42 of the holder 36 may be circular in shape, the same as the sides 14 and 16 of the holder 10 described above. The pry lever 40 thus has the shape of a tab or finger extending radially outwardly from a nominal circumference 44 of the one side 38, and the pry lever 40 may advantageously be formed as an integral part of a non-magnetic cover surrounding a magnetic core of the holder 36.

The pry lever 40, in use, provides a manual gripping element in addition to the circumferential groove 20, for removing the holder 36 from magnetic attraction to a ferrous support surface 46. The pry lever 40 may thus be particularly useful, for example, where a worker is wearing heavy gloves that make it difficult to grip the groove 20 with sufficient strength to break loose the holder 36 from its magnetic attraction to the support surface 46. Using the pry lever 40, the worker first pivots the holder 36 away from the support surface 46, as indicated by arrow 48, so that a diagonally-opposite point 50 on the other side 42 of the holder 36 functions as a fulcrum around which the holder pivots as the side 42 of the holder is lifted off the support surface. The addition of the pry lever 40 thus facilitates removing the holder 36 from magnetic attraction to the support surface 46 without relying on the annular groove 20.

It should be understood that the foregoing relates only to preferred embodiments of the present invention, and that numerous changes and modifications therein may by made without departing from the spirit and scope of the present invention as defined in the following claims.

We claim:

1. Apparatus for stabilizing an elongate workpiece threaded along at least an end thereof, comprising:

a first element operative to receive and support an end portion of the elongate workpiece;

an opening associated with the first element and having a first portion operative to receive the threaded end of the workpiece without threaded interengagement with the threads thereon, so as to stabilize the elongate workpiece;

the opening having a threaded second portion for engaging the threaded end of the workpiece, so that the second portion of the opening is selectably interoperatively engagable with the threaded end to clean the threads thereon; and a magnetic element associated with the first element for releasably holding the first element onto a ferrous support surface, so that an elongate workpiece received by the apparatus is stabilized for working thereon.

2. Apparatus for stabilizing an elongate workpiece, comprising:

a support member having a magnetic portion operative to releasably hold the support member to a ferrous support surface;

a nonmagnetic cover enclosing the magnetic portion so as to keep the magnetic portion from direct contact with the support surface while not preventing magnetic attraction to the support surface; and the support member having an opening extending through the support member and the cover and configured to receive an end of the elongated workpiece so as to stabilize the workpiece.

3. Apparatus for stabilizing an elongate workpiece, comprising:

a support member having a magnetic portion operative to releasably hold the support member to a ferrous support surface;

a nonmagnetic cover enclosing the magnetic portion so as to keep the magnetic portion from direct contact with the support surface while not preventing magnetic attraction to the support surface;

the support member having an opening configured to receive an end of the elongated workpiece;

the magnetic portion comprising a core within the nonmagnetic cover; and the cover having an exterior surface and an element protruding from the surface to enable manually grasping the support member so as to remove the support member from the ferrous surface in opposition to magnetic attraction by the magnetic portion.

4. The apparatus as in claim 3, wherein:

the support member is substantially annular in shape, having an outer circumference surrounding an interior; and the protruding element is on the outer circumference of the support member.

5. Apparatus for stabilizing an elongate workpiece, comprising:

a support member having a magnetic portion operative to releasably hold the support member to a ferrous support surface;

a nonmagnetic cover enclosing the magnetic portion so as to keep the magnetic portion from direct contact with the support surface while not preventing magnetic attraction to the support surface;

the support member having an opening configured to receive an end of the elongated workpiece;

the support member being substantially annular and having an outer surface surrounding an interior region; and the opening being in the interior region of the support member and having a portion operative to receive a threaded end of the workpiece without threaded engagement with the threads thereon, so as to stabilize the workpiece.

6. The apparatus as in claim 5, wherein:

the portion is a first portion of the opening; and the opening has a second portion configured for threaded engagement with the threaded end of the workpiece.

7. An apparatus for stabilizing an end of a threaded rod of predetermined external dimension while the rod undergoes a cutting operation, the apparatus comprising:

a substantially annular body having a magnetic core operative to attract the body to a ferrous support surface;

the annular body being disposed within a nonferrous casing; and an opening extending through the body and the casing, the opening having an interior configured to receive an end of the threaded rod without threaded engagement therewith, so as to stabilize the rod during the cutting operation.

8. The apparatus as in claim 7, wherein:

a bushing is disposed within the opening and has an interior passage;

a first portion of the interior passage is substantially smooth so as to receive an end of the threaded rod without engaging the threads thereof; and a second portion of the interior passage is threaded for engaging part of the threaded rod so as to condition the threads at that part.

9. The apparatus as in claim 8, wherein:

the body has substantially the shape of a disk having mutually spaced-apart sides separated by a circumferential exterior;

the nonferrous casing surrounds and substantially encloses the body so as to isolate the magnetic core from direct contact; and the opening extends through the disk-shaped body.

10. An apparatus for stabilizing an end of a threaded rod of predetermined external dimension while the rod undergoes a cutting operation, the apparatus comprising:

a substantially annular body having a magnetic core operative to attract the body to a ferrous support surface;

the annular body being disposed within a nonferrous casing;

an opening extending through the encased body and casing, the opening having an interior configured to receive an end of the threaded rod without threaded engagement therewith, so as to stabilize the rod during the cutting operation;

a bushing disposed within the opening and having an interior passage;

a first portion of the interior passage being substantially smooth so as to receive an end of the threaded rod without engaging the threads thereof;

a second portion of the interior passage configured for engaging part of the threaded rod so as to condition the threads at that part;

the body having substantially the shape of a disk having mutually spaced-apart sides separated by a circumferential exterior;

the nonferrous casing surrounding and substantially enclosing the body so as to isolate the magnetic core from direct contact;

the opening extending through the disk-shaped body;

the interior passage of the body having openings to the sides of the disk-shaped body; and the first portion of the interior passage being at one of the sides, and the second portion of the interior passage being at the other of the sides.

11. The apparatus as in claim 7, wherein:

the nonferrous casing has a surface for contacting the support surface; and a pry lever is disposed on the nonferrous casing in spaced apart relation to the surface and operative for manual engagement to separate the casing from the support surface in opposition to magnetic attraction.

12. The apparatus as in claim 7, wherein:

the nonferrous casing has a first surface for contacting the support surface and a second surface spaced apart from the first surface; and a pry lever is associated with the second surface and is operative for manual engagement to exert force for separating at least a portion of the first surface from the support surface, thereby assisting removal of the apparatus from the support surface in opposition to magnetic attraction.

* * * * *